US012620212B2

(12) United States Patent (10) Patent No.: US 12,620,212 B2
Keysers et al. (45) Date of Patent: May 5, 2026

(54) LOCKED-MODEL MULTIMODAL CONTRASTIVE TUNING

(71) Applicant: Google LLC, Mountain View, CA (US)

(72) Inventors: Daniel Keysers, Stallikon (CH); Xiaohua Zhai, Rüschlikon (CH); Xiao Wang, Kilchberg (CH); Lucas Beyer, Zürich (CH); Basil Mustafa, Zürich (CH); Andreas Steiner, Zürich (CH); Alexander Kolesnikov, Zürich (CH)

(73) Assignee: Google LLC, Mountain View, CA (US)

( * ) Notice: Subject to any disclaimer, the term of this patent is extended or adjusted under 35 U.S.C. 154(b) by 701 days.

(21) Appl. No.: 18/051,106

(22) Filed: Oct. 31, 2022

(65) Prior Publication Data

US 2024/0153256 A1     May 9, 2024

(51) Int. Cl.
*G06V 10/778* (2022.01)
(52) U.S. Cl.
CPC ................................. *G06V 10/778* (2022.01)
(58) Field of Classification Search
CPC ........ G06N 3/0895; G06N 3/08; G06N 3/045;
G06N 3/088; G06N 3/044; G06N 3/0455;
G06N 20/00; G06V 10/778; G06V 10/82
See application file for complete search history.

(56) References Cited

U.S. PATENT DOCUMENTS

2018/0373979 A1* 12/2018 Wang ................ G06F 18/24143
2022/0147838 A1* 5/2022 Gu .......................... G06V 10/86

2022/0172080 A1* 6/2022 Chaudhury .............. G06N 3/08
2022/0353522 A1* 11/2022 Ding .................... H04N 19/132
2023/0019211 A1* 1/2023 Wang ................... G06N 3/0464
2023/0177810 A1* 6/2023 Xu ....................... G06V 10/774
382/159
2023/0325685 A1* 10/2023 Caba Heilbron .... G06V 10/764

OTHER PUBLICATIONS

Zhang, Yuhao, et al. "Contrastive learning of medical visual representations from paired images and text." Machine learning for healthcare conference. PMLR, 2022. (Year: 2022).*

(Continued)

*Primary Examiner* — Andrew W Bee
*Assistant Examiner* — Rebecca Colette Williams
(74) *Attorney, Agent, or Firm* — McDonnell Boehnen Hulbert & Berghoff LLP

(57) ABSTRACT

A method may include obtaining a pretrained image encoder and a training sample comprising a training image and a training text string corresponding to the training image. The method may also include initializing a text encoder in an untrained state, determining, using the pretrained image encoder and based on the training image, a first latent representation of the training image, and determining, using the text encoder and based on the training text string, a second latent representation of the training text string. The method may further include determining a loss value based on the first latent representation and the second latent representation, updating, based on the loss value, one or more parameters of the text encoder while holding fixed parameters of the pretrained image encoder, and outputting the text encoder in a trained state.

20 Claims, 6 Drawing Sheets

(56) References Cited

OTHER PUBLICATIONS

Radford, Alec, et al. "Learning transferable visual models from natural language supervision." International conference on machine learning. PmLR, 2021. (Year: 2021).*

Lee, Janghyeon, et al. "Uniclip: Unified framework for contrastive language-image pre-training." Advances in Neural Information Processing Systems 35 (2022): 1008-1019. (Year: 2022).*

Chen, Tianlang, and Jiebo Luo. "Expressing objects just like words: Recurrent visual embedding for image-text matching." Proceedings of the AAAI conference on artificial intelligence. vol. 34. No. 07. 2020. (Year: 2020).*

Steiner et al., "Locked-Image Tuning: Adding Language Understanding to Image Models," Google Research, Apr. 14, 2022, 7 pages.

Zhai et al., "LiT: Zero-Shot Transfer with Locked-image text Tuning," arXiv:2111.07991v3, Jun. 22, 2022, first submitted on Nov. 15, 2021, 28 pages.

* cited by examiner

FRONT VIEW       RIGHT SIDE VIEW       BACK VIEW

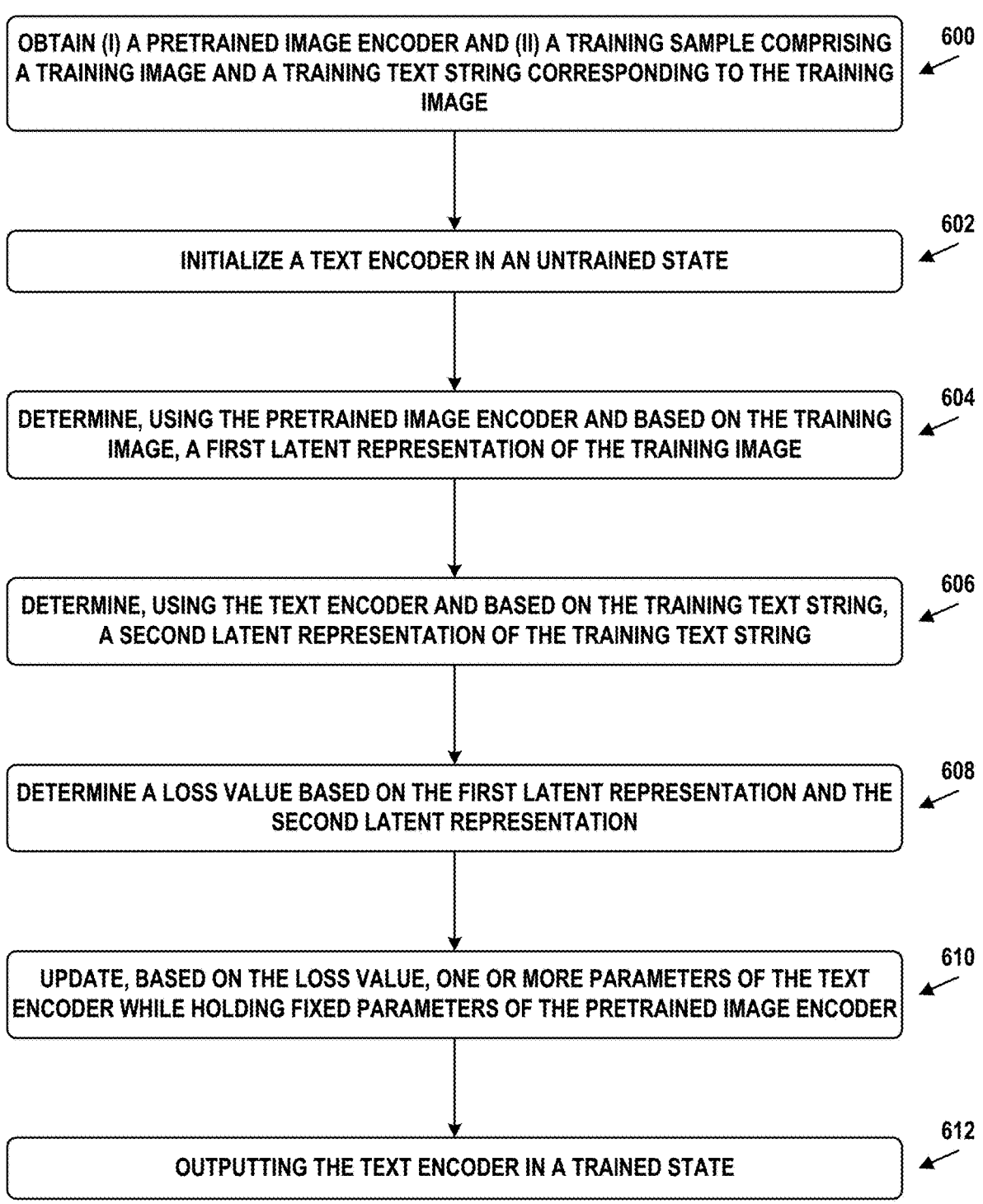

OBTAIN (I) A PRETRAINED IMAGE ENCODER AND (II) A TRAINING SAMPLE COMPRISING A TRAINING IMAGE AND A TRAINING TEXT STRING CORRESPONDING TO THE TRAINING IMAGE — 600

INITIALIZE A TEXT ENCODER IN AN UNTRAINED STATE — 602

DETERMINE, USING THE PRETRAINED IMAGE ENCODER AND BASED ON THE TRAINING IMAGE, A FIRST LATENT REPRESENTATION OF THE TRAINING IMAGE — 604

DETERMINE, USING THE TEXT ENCODER AND BASED ON THE TRAINING TEXT STRING, A SECOND LATENT REPRESENTATION OF THE TRAINING TEXT STRING — 606

DETERMINE A LOSS VALUE BASED ON THE FIRST LATENT REPRESENTATION AND THE SECOND LATENT REPRESENTATION — 608

UPDATE, BASED ON THE LOSS VALUE, ONE OR MORE PARAMETERS OF THE TEXT ENCODER WHILE HOLDING FIXED PARAMETERS OF THE PRETRAINED IMAGE ENCODER — 610

OUTPUTTING THE TEXT ENCODER IN A TRAINED STATE — 612

Figure 6

LOCKED-MODEL MULTIMODAL CONTRASTIVE TUNING

BACKGROUND

Machine Learning models may be used to process various types of data, including images, video, time series, text, and/or point clouds, among other possibilities. Improvements in the machine learning models may allow the models to carry out the processing of data faster and/or utilize fewer computing resources for the processing. Improvements in the machine learning models may also allow the models to generate outputs that are relatively more accurate, precise, and/or otherwise improved.

SUMMARY

A first machine learning model and a second machine learning model, each configured to process a different type of data, may be trained using a contrastive learning process to generate similar latent representation for matched pairs of input samples of the different types of data and dissimilar latent representation for unmatched pairs of input samples of the different types of data. For example, the first machine learning model may be configured to generate latent representations of images, while the second machine learning model may be configured to generate latent representations of text strings. When a text string is descriptive of an image, respective latent representation of the text string and the image may be similar. When the text string is not descriptive of the image, respective latent representation of the text string and the image may be dissimilar. The contrastive learning process may be improved by, prior to contrastive training, pretraining the first machine learning model and, during the contrastive training, holding its parameters fixed while adjusting parameters of the second machine learning model. Thus, the second machine learning model may be trained to match latent representations generated by the first machine learning model, and the first machine learning model might not need to relearn to generate useful latent representations, thereby simplifying the contrastive learning process and improving the models resulting therefrom.

In a first example embodiment, a method may include obtaining (i) a pretrained image encoder and (ii) a training sample that includes a training image and a training text string corresponding to the training image. The method may also include initializing a text encoder in an untrained state. The method may additionally include determining, using the pretrained image encoder and based on the training image, a first latent representation of the training image, and determining, using the text encoder and based on the training text string, a second latent representation of the training text string. The method may further include determining a loss value based on the first latent representation and the second latent representation. The method may yet further include updating, based on the loss value, one or more parameters of the text encoder while holding fixed parameters of the pretrained image encoder, and outputting the text encoder in a trained state.

In a second example embodiment, a system may include a processor and a non-transitory computer-readable medium having stored thereon instructions that, when executed by the processor, cause the processor to perform operations in accordance with the first example embodiment.

In a third example embodiment, a non-transitory computer-readable medium may have stored thereon instructions that, when executed by a computing device, cause the computing device to perform operations in accordance with the first example embodiment.

In a fourth example embodiment, a system may include various means for carrying out each of the operations of the first example embodiment.

In a fifth example embodiment, a method may include obtaining an image, a text string, a pretrained image encoder, and a text encoder. The text encoder may be trained by a training process that includes obtaining (i) the pretrained image encoder and (ii) a training sample including a training image and a training text string corresponding to the training image. The training process may also include initializing the text encoder in an untrained state. The training process may additionally include determining, using the pretrained image encoder and based on the training image, a first latent representation of the training image, and determining, using the text encoder and based on the training text string, a second latent representation of the training text string. The training process may further include determining a loss value based on the first latent representation and the second latent representation. The training process may yet further include updating, based on the loss value, one or more parameters of the text encoder while holding fixed parameters of the pretrained image encoder. The method may also include determining, using the pretrained image encoder and based on the image, a third latent representation of the image, and determining, using the text encoder and based on the text string, a fourth latent representation of the text string. The method may further include determining a similarity between the third latent representation and the fourth latent representation, and generating an output based on the similarity.

In a sixth example embodiment, a system may include a processor and a non-transitory computer-readable medium having stored thereon instructions that, when executed by the processor, cause the processor to perform operations in accordance with the fifth example embodiment.

In a seventh example embodiment, a non-transitory computer-readable medium may have stored thereon instructions that, when executed by a computing device, cause the computing device to perform operations in accordance with the fifth example embodiment.

In an eighth example embodiment, a system may include various means for carrying out each of the operations of the fifth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 illustrates a flow chart, in accordance with examples described herein.

DETAILED DESCRIPTION

Figure 1:
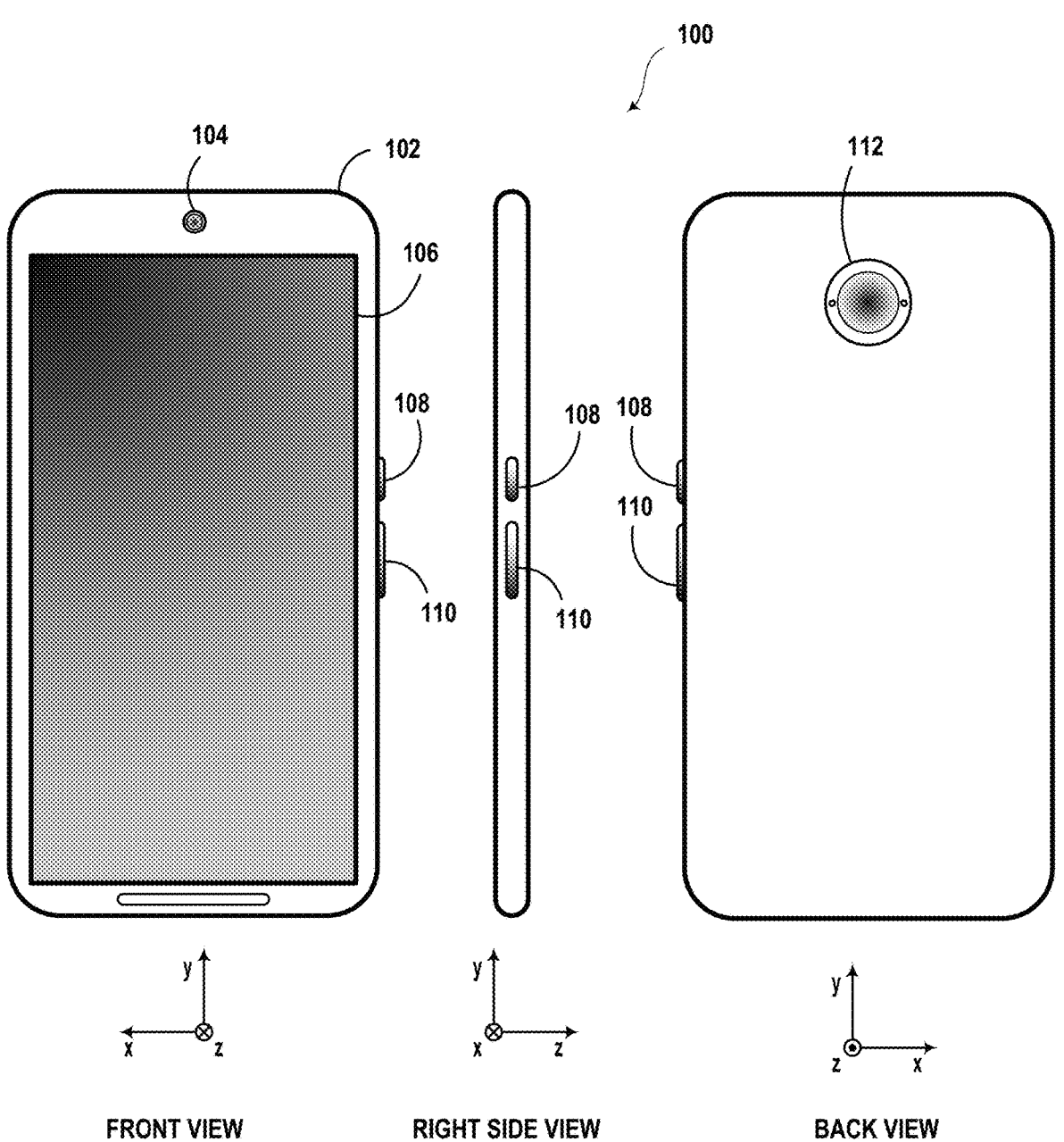
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

Multimodal contrastive learning involves training at least two machine learning (ML) models, each of which operates on a different type of data, to generate similar latent representations (e.g., embeddings such as vectors and/or feature maps) for matched sample pairs and dissimilar latent representations for unmatched sample pairs. For example, a first ML model may be configured to accept as input a first type of data, such as image data, and generate latent representations thereof. A second ML model may be configured to accept as input a second type of data, such as text data, and generate latent representations thereof. The first ML model and the second ML model may be trained jointly such that (i), when a first sample of the first type of data matches a second sample of the second type of data, a first latent representation generated by the first ML model based on the first sample is similar (e.g. as measured using a vector distance metric) to a second latent representation generated by the second ML model based on the second sample, and (ii), when the first sample does not match a third sample of the second type of data, the first latent representation is dissimilar to a third latent representation generated by the second ML model based on the third sample.

For example, when the first and second ML models operate on image and text data, respectively, the first and second ML models may be trained to generate similar latent representations when an image is described (e.g., accurately described) by corresponding text, and generate dissimilar latent representations when an image is not described (e.g., described inaccurately) by corresponding text. As one example, when the image depicts a dog, the latent representation of the image should be similar to the latent representation of the text string "dog" (and other text strings that describe the image of the dog), but should be dissimilar to the latent representation of the text string "tractor" (and other text strings that do not describe the image of the dog).

ML models trained in this manner may be configured to perform new tasks without additional data (i.e., zero-shot learning, sometimes referred to as zero-shot transfer) and/or without additional fine-tuning of either model, by formulating the new tasks as a matching task. For example, the ML models may be configured to classify an image by determining which text latent representation of a plurality of latent representations of various text string is most similar to an image latent representation of the image. Thus, the ML models may be configured to perform new tasks regardless of availability of additional task-specific fine-tuning training data.

When both the first ML model and the second ML model are initialized in an untrained state (i.e., from "scratch," without prior training), training of the ML models may involve the ML models simultaneously learning to generate latent representations that (i) meaningfully and/or accurately represent the input data and (ii) exhibit an appropriate extent of similarity across data types, with matched samples having similar latent representations and unmatched samples having dissimilar latent representations. Because such training may involve meeting two separate objectives, models trained in this manner may underperform models that have been pretrained and subsequently fine-tuned using transfer learning, since transfer learning might not depend on simultaneously meeting these two objectives.

The performance of ML models trained using multimodal contrastive learning may be improved by performing the training using a first ML model that has been pretrained and a second ML model that is initialized in the untrained state. For example, the first ML model may be pretrained (independently of the second ML model) to generate latent representations using a relatively large training data set, and may thus be configured to generate latent representations that meaningfully and/or accurately represent the input data. During contrastive training, parameters of the first (pretrained) ML model may be held fixed (i.e., locked or frozen), while parameters of the second (untrained) ML model may be updated based on additional training samples. Thus, the second ML model may be trained to generate latent representations that exhibit the appropriate extent of similarity with corresponding latent representations generated by the first ML model. In some implementations, the second ML model may alternatively be initialized in a pretrained state, although its parameters may be unlocked, and thus modifiable during training while the first ML model remains locked.

That is, training may involve configuring the second ML model to match the latent representations of the first ML model, but at least the first ML model might not need to be retrained to generate meaningful and/or accurate latent representations due to the pre-training thereof. Holding fixed the parameters of the first ML model may improve learning, rather than harming it, at least because the contrastive learning might thus be prevented from causing the first ML model to unlearn latent representations that are, as a result of the pre-training, relatively meaningful and/or accurate. Because of such training, the resulting ML models may perform better than ML models contrastively trained without locking the parameters of one of the ML models during training, and may do so without reliance on additional fine-tuning training data as in the case of transfer learning. Additionally, such training may take fewer training iterations and might not back propagate gradients through the (locked) first ML model, thus using less power, energy, and/or computing resources (e.g., memory and/or processor cycles).

II. EXAMPLE COMPUTING DEVICES AND SYSTEMS

FIG. 1 illustrates an example computing device 100. Computing device 100 is shown in the form factor of a mobile phone. However, computing device 100 may be alternatively implemented as a laptop computer, a tablet computer, and/or a wearable computing device, among other possibilities. Computing device 100 may include various elements, such as body 102, display 106, and buttons 108 and 110. Computing device 100 may further include one or more cameras, such as front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of one or more aspects of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic, stereoscopic, or multiscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving computing device 100 a predetermined distance, or according to a predetermined capture schedule.

Figure 2:
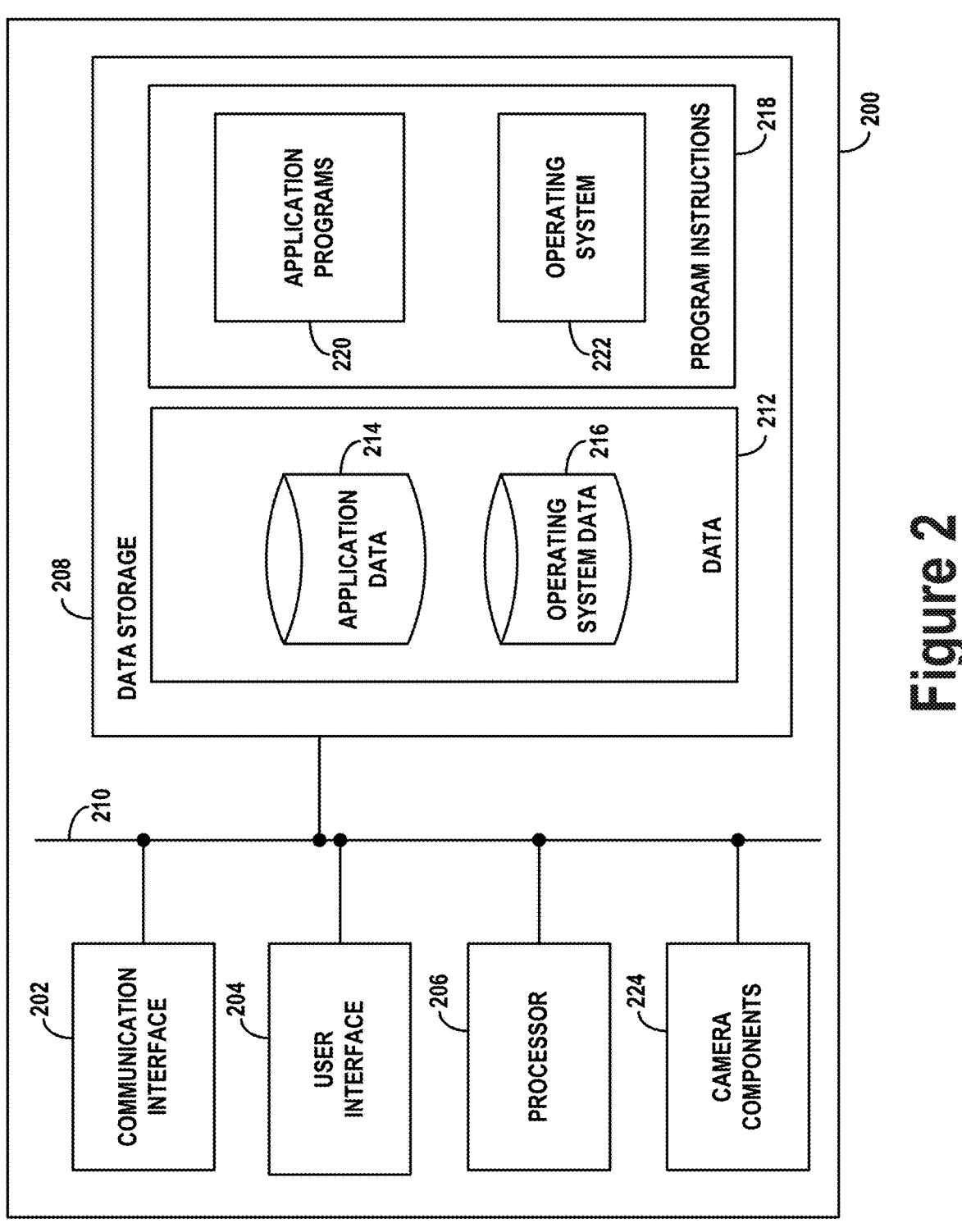
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, server, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and/or processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port, among other possibilities. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)), among other possibilities. However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen, which, for example, may be combined with a touch-sensitive panel. The display screen may be based on CRT, LCD, LED, and/or OLED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and/or components configured for capturing of images in the infrared light spectrum (e.g., electromagnetic radiation having a wavelength of 701 nanometers-1 millimeter), among other possibilities. Camera components 224 may be controlled at least in part by software executed by processor 206.

III. EXAMPLE MULTIMODAL CONTRASTIVE TRAINING SYSTEM

Figure 3:
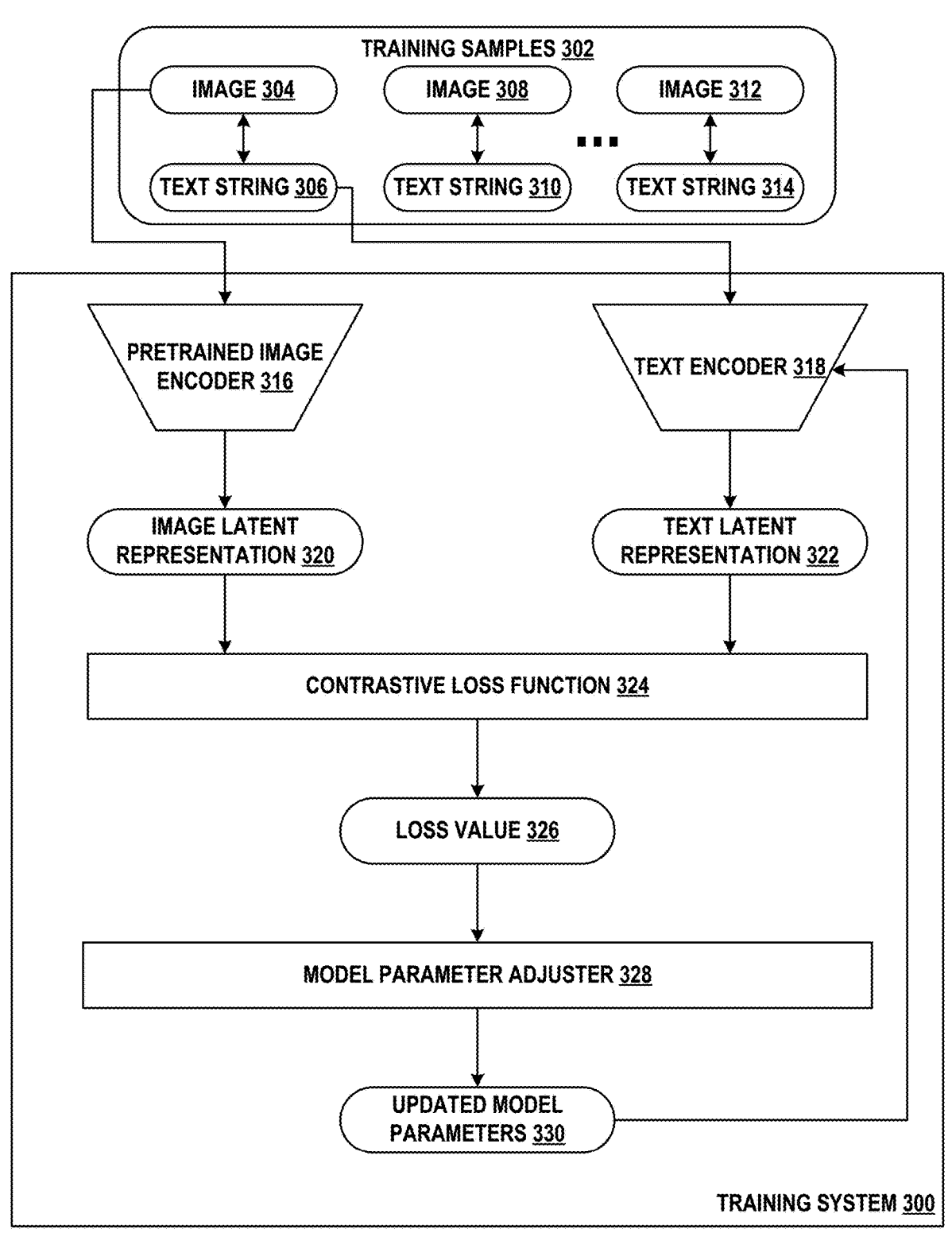
FIG. 3 illustrates a training system, in accordance with examples described herein.

FIG. 3 illustrates an example training system that may be used to train one or more machine learning models using a multimodal contrastive learning arrangement. Specifically, training system 300 may include a first machine learning model that has been pretrained, and a second machine learning model that is initialized in an untrained state. In FIG. 3, pretrained image encoder 316 provides an example of the first (pretrained) machine learning model, and text encoder 318 provides an example of the second (initially untrained) machine learning model. Training system 300 may be configured to generate a trained version of text encoder 318 based on training samples 302. Training system 300 may additionally include contrastive loss function 324 and model parameter adjuster 328.

Training samples 302 may include a plurality of training samples of a first type matched with a plurality of training samples of a second type. For example, training samples 302 may include image 304 matched with text string 306, image 308 matched with text string 310, and image 312 matched with text string 314. Thus, images 304 and 308 through 312 (i.e., images 304-312) may be training samples of the first type that provide a first data modality for the multimodal contrastive training process, while text strings 306 and 310 through 314 (i.e., text strings 306-314) may be training samples of the second type that provide a second data modality for the multimodal contrastive training process. Each of text strings 306-314 may include a sequence of one or more text characters.

Although text-image pairs are used herein as examples, it is to be understood that encoders 316 and 318 may alternatively represent machine learning models configured to process any combination of two different types of data for which training samples are available. For example, training samples could include matched pairs of videos and corresponding text strings, point clouds and corresponding images, and/or audio waveforms and corresponding text strings, among other possibilities.

Pretrained image encoder 316 may, prior to training using training system 300, be trained to generate image latent representations that meaningfully and/or accurately represent the visual content of images, and may thus be considered "pretrained." For example, pretrained image encoder 316 may be pretrained using a relatively large pretraining image dataset to generate latent representations for a wide range of possible images. Pretrained image encoder 316 may be pretrained using an autoencoding architecture in which a decoder model uses image latent representations generated by image encoder 316 based on pretraining images of the pretraining image dataset to reconstruct the pretraining images. In general, image encoder 316 may be pretrained using any available technique and/or dataset, provided that the image latent representations generated thereby represent the visual content of corresponding images in a useful, meaningful, and/or accurate manner.

Since image encoder 316 is pretrained, parameters of image encoder 316 may be held fixed (i.e., locked) by training system 300 for the duration of training, which may prevent image encoder 316 from unlearning proficiencies gained during the pretraining. Text encoder 318 may be initialized in an untrained state, and may be contrastively trained with pretrained image encoder 316 to generate text latent representations that are coordinated with (e.g., similar or dissimilar, depending on the training sample) image latent representations generated by pretrained image encoder 316. For example, text encoder 318 may be initialized using values that are selected substantially and/or approximately randomly (e.g., from a Gaussian distribution). Since image encoder 316 is locked for the duration of training, training system 300 may be configured to perform the multimodal contrastive training by iteratively updating parameters of text encoder 318 until text encoder 318 learns to generate text latent representations that are coordinated with the image latent representations generated by pretrained image encoder 316.

In some implementations, rather than being initialized in the untrained state, text encoder 318 may also be pretrained, but may remain unlocked for the duration of training. Starting training with a pretrained text encoder 318 may facilitate training because at least some of the proficiencies learned during pretraining of text encoder 318 may be applicable to the contrastive training task, and might thus not need to be re-learned. When pretrained prior to contrastive training, text encoder 318 may unlearn other proficiencies (e.g., inapplicable to the contrastive training task) gained as part of the pretraining in order to learn to coordinate its latent representations with those of locked image encoder 318. For example, text encoder 318 may be pretrained when a relatively small amount of training data is available for contrastive training.

In some implementations, all parameters of image encoder 316 may be held fixed (i.e., locked) by training system 300 for the duration of training, and thus only parameters of text encoder 318 may be modifiable during training. This may prevent image encoder 316 from unlearning any proficiencies gained during the pretraining.

In other implementations, some parameters of image encoder 316 may be held fixed (i.e., locked) by training system 300 for the duration of training, and other parameters of image encoder 316 may be modifiable during training. As one example, the number of parameters and/or layers of image encoder 316 that are held fixed may be greater than a number of the parameters and/or layers, respectively, of image encoder 316 that are modifiable. This may prevent image encoder 316 from unlearning some proficiencies gained during the pretraining, and may allow image encoder 316 to gain additional proficiencies as part of the multimodal contrastive training. As another example, a first plurality of lower-level layers (i.e., layers closer to the input) of image encoder 316 may be held fixed, while one or more higher-level layers (i.e., layers closer to the input) of image encoder 316 may be modifiable.

In some implementations, training system 300 may be configured to execute a plurality of independent instances of the training process, with each respective instance resulting in a different trained version of text encoder 318 and/or pretrained image encoder 316. For example, each respective training instance of the plurality of independent training instances may allow respective parameters a different layer of pretrained image encoder 316 to be modified, while keeping the parameters of all other layers locked. Each trained version of text encoder 318 and/or pretrained image encoder 316 may be tested with respect to a validation data set, and a version with the best performance on the validation data set may be selected for task-specific inference applications (and the other versions may be discarded). Thus, the plurality of independent instances of the training process may allow for an empirical identification of one or more layers of pretrained image encoder 316 that could be modified during training to improve performance of the resulting pair of encoders 316 and 318 without allowing substantial unlearning of proficiencies of pretrained image encoder 316, thereby balancing pretraining with additional contrastive training.

In some implementations, a number of modifiable parameters and/or layers of pretrained image encoder 316 may be increased over the course of training, thus decreasing a number of parameters and/or layers that are locked. For example, at each successive training iteration, additional parameters and/or layers of pretrained image encoder 316 may be unlocked, and thus become modifiable. The rate of increase may be linear and/or non-linear, and may be performed until training is completed and/or a maximum number of parameters and/or layers is unlocked. For example, layers and/or parameters may be unlocked for modification according to a predetermined schedule (e.g., starting at the output layer, with N training iterations performed between making each additional layer modifiable), and the maximum number of layers may be selected empirically, such that the resulting image encoder 316 and text encoder 318 perform better on a benchmark task than another pair of encoders trained without locking any parameters of the image encoder.

As part of the multimodal contrastive training, pretrained image encoder 316 may be configured to generate image latent representation 320 based on image 304, and text encoder 318 may be configured to generate text latent representation 322 based on text string 306. Pretrained image encoder 316 may also be configured to generate corresponding image latent representations (not shown) for each of images 308-312, and text encoder 318 may also be configured to generate corresponding text latent representations (not shown) for each of text strings 310-314.

Image latent representation 320 may have a same size as text latent representation 322. In cases where a dimension of an output of pretrained image encoder 316 does not match a dimension of an output of text encoder 318, a final projection layer may be added to at least one of pretrained image encoder 316 or text encoder 318 to project an output of a penultimate layer thereof to a common dimension.

Contrastive loss function 324 may be configured to generate loss value 326 based on comparing the image latent representations generated by pretrained image encoder 316 to the text latent representations generated by text encoder 318. Specifically, loss value 326 may be based on comparing the respective latent representations of matched image-text training samples, and/or unmatched image-text training samples. Contrastive loss function 324 may be configured to, for matched image-text training samples, incentivize text encoder 318 to generate text latent representations that are similar to corresponding image latent representations generated by pretrained image encoder 316 and, for unmatched image-text training samples, incentivize text encoder 318 to generate text latent representations that are dissimilar to corresponding image latent representations generated by pretrained image encoder 316.

Contrastive loss function 324 may be expressed as $$\mathcal{L} = \frac{1}{N}\sum_{i=1}^{N}\left(\lambda l_i^{(v\to u)} + (1-\lambda)l_i^{(u\to v)}\right),$$

$$\text{where } l_i^{(v\to u)} = -\log\frac{\exp\left(\langle v_i, u_i\rangle/\tau\right)}{\sum_{k=1}^{N}\exp\left(\langle v_i, u_k\rangle/\tau\right)}$$

represents an image-to-text contrastive loss, $$l_i^{(u\to v)} = -\log\frac{\exp\left(\langle u_i, v_i\rangle/\tau\right)}{\sum_{k=1}^{N}\exp\left(\langle u_i, v_k\rangle/\tau\right)}$$

represents a text-to-image contrastive loss, u represents a text latent representation, v represents an image latent representation, N represents a number of samples considered per training batch and/or mini-batch, $\langle v_i, u_i\rangle$ represents a cosine similarity between $v_i$ and $u_i$, $\tau\in\mathbb{R}^{+}$ represents a modifiable temperature parameter, and $\lambda\in[0, 1]$ represents a modifiable scalar weight. In some implementations, contrastive loss function 324 may be replaced by or used in combination with other loss functions, such as a triplet loss function, among other possibilities.

As examples of matched text-image training samples expected to have similar latent representations, contrastive loss function 324 may be configured to generate loss value 326 based on comparing (i) image latent representation 320 of image 304 to text latent representation 322 of text string 306, (ii) a corresponding image latent representation of image 308 to a corresponding text latent representation of text string 310, and/or (iii) a corresponding image latent representation of image 312 to a corresponding text latent representation of text string 314. As an example of unmatched text-image training samples expected to have dissimilar latent representations, contrastive loss function 324 may be configured to generate loss value 326 based on comparing (i) a corresponding image latent representation of image 304 to corresponding text latent representations of each of text strings 310 and 314, (ii) a corresponding image latent representation of image 308 to corresponding text latent representations of each of text strings 306 and 314, and/or (iii) a corresponding image latent representation of image 312 to corresponding text latent representations of each of text strings 306 and 310. Additional examples of matched and unmatched training samples are provided in and discussed with respect to FIG. 4.

Model parameter adjuster 328 may be configured to determine updated model parameters 330 based on loss value 326. Specifically, updated model parameters 330 may be selected such that respective similarities of the latent representations of matched image-text training samples are caused to increase, and/or the respective similarities of latent representations of unmatched image-text training samples are caused to decrease.

Updated model parameters 330 may include one or more updated parameters of any trainable component of text encoder 318. In implementations where all parameters of pretrained image encoder 316 are held fixed for the duration of training, updated model parameters 330 might not include any updated model parameters for pretrained image encoder 316. In implementations where some parameters of pretrained image encoder 316 are held fixed, while others are modifiable, updated model parameters 330 may include one or more updated model parameters for modifiable portions of pretrained image encoder 316.

Model parameter adjuster 328 may be configured to determine updated model parameters 330 by, for example, determining a gradient of contrastive loss function 324. Based on this gradient and loss value 326, model parameter adjuster 328 may be configured to select updated model parameters 330 that are expected to reduce loss value 326, and thus improve a combined performance of text encoder 318 and pretrained image encoder 316. After applying updated model parameters 330 to text encoder 318 (and, in some cases, to some portions of pretrained image encoder 316), the operations discussed above may be repeated to compute another instance of loss value 326 and, based thereon, another instance of updated model parameters 330 may be determined and applied to text encoder 318 (and, in some cases, to some portions of pretrained image encoder 316) to further improve the performance thereof. Such training of text encoder 318 and/or pretrained image encoder 316 may be repeated until, for example, loss value 326 is reduced to below a target loss value.

While FIG. 3 illustrates image encoder 316 as the locked model and text encoder 318 as the modifiable model, in other implementations text encoder 318 may instead be pretrained and locked while image encoder 316 may be modifiable. The locked model may be selected, for example, based on availability of pretraining data and/or a quality of embeddings generated by the locked model following pretraining. Thus, a first machine learning model may be locked, while a second machine learning model may be trainable, when a first pretraining data set is available for pretraining the first machine learning model and a second pretraining data set is unavailable for the second machine learning model and/or the second pretraining data set is smaller, of a lower quality than, and/or otherwise deficient relative to the first pretraining data set.

IV. EXAMPLE MATCHED AND UNMATCHED TRAINING SAMPLE PAIRS

Figure 4:
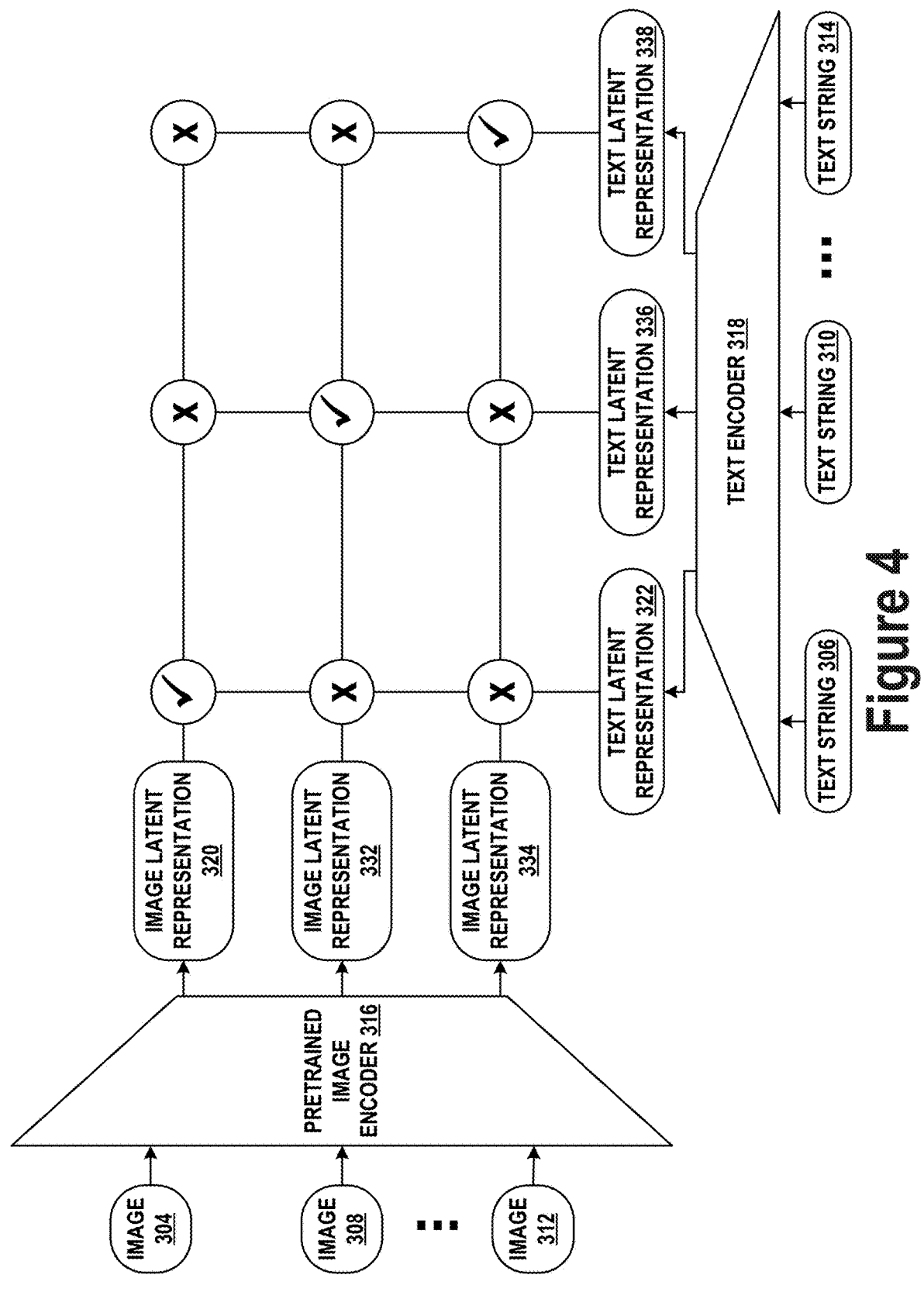
FIG. 4 illustrates aspects of a contrastive training process, in accordance with examples described herein.

FIG. 4 illustrates examples of matched and unmatched image-text pairs that may be used as part of the multimodal contrastive training process discussed in connection with FIG. 3. Specifically, pretrained image encoder 316 may be configured to generate image latent representation 320 based on image 304, image latent representation 332 based on image 308, and image latent representation 334 based on image 312. Text encoder 318 may be configured to generate text latent representation 322 based on text string 306, text latent representation 336 based on text string 310, and text latent representation 338 based on text string 314.

Since images 304, 308, and 312 are matched with, respectively, text strings 306, 310, and 314, as indicated by training samples 302 of FIG. 3 and the check marks of FIG. 4, image latent representations 320, 332, and 334 should, as a result of training, be similar to text latent representations 322, 336, and 338, respectively. Additionally, as a result of training, image latent representation 320 should be dissimilar from text latent representations 336 and 338, image latent representation 332 should be dissimilar from text latent representations 322 and 338, and image latent representation 334 should be dissimilar from text latent representations 322 and 336, as indicated by the "X" marks.

The numerators of contrastive loss function 324 (i.e., the term $\exp(\langle v_i, u_i \rangle / \tau)$ in $$l_i^{(v \to u)}$$

and the term $$\exp(\langle u_i, v_i \rangle / \tau) \text{ in } l_i^{(u \to v)})$$

may be configured to incentivize convergence in the latent representations of matched text-image pairs, as indicated by the check marks. The denominators of contrastive loss function 324 (i.e., the term $$\sum_{k=1}^{N} \exp(\langle v_i, u_k \rangle / \tau) \text{ in } l_i^{(v \to u)}$$

and the term $$\sum_{k=1}^{N} \exp(\langle u_i, v_k \rangle / \tau) \text{ in } l_i^{(u \to v)})$$

may be configured to incentivize divergence in the latent representations of unmatched text-image pairs, as indicated by the "X" marks.

As a result of image encoder 316 being pretrained, image latent representations 320 and 332 through 334 (i.e., image latent representations 320-334) might not substantially vary among training iterations and/or batches. Accordingly, since parameters of pretrained image encoder 316 may remain fixed, a gradient with respect to any such fixed parameters might not be determined and/or considered as part of determining updated model parameters for text encoder 318, and thus the training process for text encoder 318 may be faster and/or may utilize less power, energy, and/or computing resources. Further, in implementations where all parameters of pretrained image encoder 316 are held fixed for the duration of training, image latent representations 320-334 may be precomputed prior to training, and may be reused across multiple iterations of the training, thereby further accelerating training and reducing usage power, energy, and/or computing resources.

V. EXAMPLE ZERO-SHOT LEARNING AND INFERENCE

Figure 5:
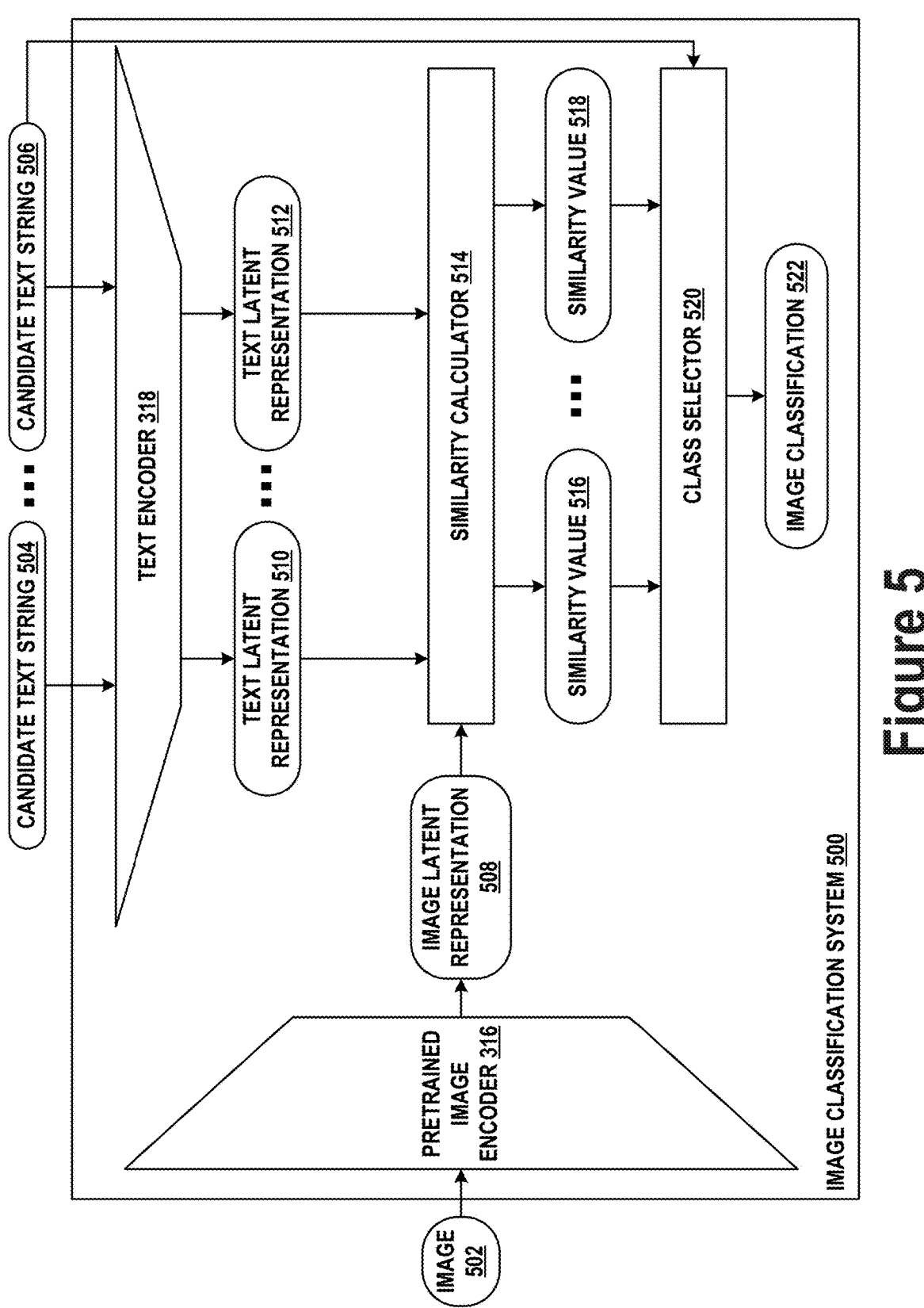
FIG. 5 illustrates a task-specific inference system, in accordance with examples described herein.

FIG. 5 illustrates an example application of pretrained image encoder 316 and text encoder 318 (in a trained state)

to a new task for which additional fine-tuning training data is not available and/or for which fine-tuning training is not performed. Specifically, the new task may be an image classification task. Thus, image classification system 500 may include pretrained image encoder 316, text encoder 318, similarity calculator 514, and class selector 520.

Image classification system 500 may be configured to classify image 502 (which may be referred to as an image query) into one of a plurality of classes as defined by candidate text string 504 through candidate text string 506 (i.e., candidate text strings 504-506). Candidate text strings 504-506 may be definable by a user on a per-task basis, and may thus allow image classification system 500 to classify image 502 among any number of freely and/or arbitrarily defined classes that do not depend on availability of additional fine-tuning data.

Pretrained image encoder 316 may be configured to determine image latent representation 508 based on image 502. Text encoder 318 may be configured to generate text latent representation 510 through text latent representation 512 (i.e., text latent representations 510-512) based respectively on candidate text strings 504-506. That is, text latent representation 510 may be based on and represent candidate text string 504, and text latent representation 512 may be based on and represent candidate text string 506.

Similarity calculator 514 may be configured to determine a corresponding similarity between image latent representation 508 and each of text latent representations 510-512. Thus, similarity calculator 514 may be configured to generate similarity value 516 through similarity value 518 (i.e., similarity values 516-518). Similarity value 516 may represent a similarity between image latent representation 508 and text latent representation 510, and similarity value 518 may represent a similarity between image latent representation 508 and text latent representation 512. Similarity calculator 514 may be configured to determine similarity values 516-518 using, for example, a vector distance metric, such as a cosine distance and/or a Euclidean distance, among other possibilities.

Class selector 520 may be configured to select, from candidate text strings 504-506 and based on similarity values 516-518, image classification 522 for image 502. For example, class selector 520 may select, as image classification 522, a candidate test string having a highest similarity to image 502, as represented by similarity values 516-518. By redefining the candidate text string input into image classification system 500, the classes among which image 502 is classified may be modified. Thus, the specific classification task performed by image classification system 500 may be modified without additional training data.

In some implementations, system 500 may be modified to perform image retrieval instead of image classification. For example, a query text string may be provided as input to text encoder 318, and a plurality of candidate images may be provided as input to pretrained image encoder 316. Similarity calculator 514 may be configured to determine corresponding similarity values between a text latent representation of the query text string and the respective image latent representations of each of the plurality of candidate images. Based on the corresponding similarity values, selector 520 may be configured to select an image of the plurality of candidate images that is best described by the query text string.

In general, a first (pretrained) machine learning model configured to operate on a first type of data and a second machine learning model configured to operate on a (different) second type of data, each trained using a multimodal contrastive learning process (as discussed in connection with FIGS. 3 and 4), may be used to perform a plurality of different tasks independently of additional fine-tuning data, provided that the plurality of different tasks can be performed based on similarities of latent representations generated by the first and second machine learning models (as discussed in connection with FIG. 5).

VI. ADDITIONAL EXAMPLE OPERATIONS

FIG. 6 illustrates a flow chart of operations related to a multimodal contrastive training process. The operations may be carried out by computing device 100, computing system 200, and/or training system 300, among other possibilities. The embodiments of FIG. 6 may be simplified by the removal of any one or more of the features shown therein. Further, these embodiments may be combined with features, aspects, and/or implementations of any of the previous figures or otherwise described herein.

Block 600 may involve obtaining (i) a pretrained image encoder and (ii) a training sample that includes a training image and a training text string corresponding to the training image.

Block 602 may involve initializing a text encoder in an untrained state.

Block 604 may involve determining, using the pretrained image encoder and based on the training image, a first latent representation of the training image.

Block 606 may involve determining, using the text encoder and based on the training text string, a second latent representation of the training text string.

Block 608 may involve determining a loss value based on the first latent representation and the second latent representation.

Block 610 may involve updating, based on the loss value, one or more parameters of the text encoder while holding fixed parameters of the pretrained image encoder.

Block 612 may involve outputting the text encoder in a trained state.

In some embodiments, the pretrained image encoder and the text encoder may form a multimodal contrastive learning pair. Updating the one or more parameters of the text encoder may be configured to train the text encoder to generate latent representations that, for a given training sample, converge to latent representations generated by the pretrained image encoder.

In some embodiments, holding fixed parameters of the pretrained image encoder may include holding fixed all parameters of the pretrained image encoder.

In some embodiments, holding fixed parameters of the pretrained image encoder may include holding fixed all parameters of a first number of layers of the pretrained image encoder, and updating, based on the loss value, at least one parameter of a second number of layers of the pretrained image encoder. The first number may exceed the second number.

In some embodiments, the parameters of the pretrained image encoder may remain fixed for a duration of training of the text encoder.

In some embodiments, initializing the text encoder may include initializing parameters of the text encoder using substantially randomly selected values.

In some embodiments, a size of the first latent representation may be equal to a size of the second latent representation.

In some embodiments, an output layer of the pretrained image encoder may have a first size. The text encoder may include a final projection layer configured to project an output of a penultimate layer of the text encoder to the first size.

In some embodiments, determining the loss value may include determining the loss value using a contrastive loss function configured to determine a similarity between the first latent representation and the second latent representation.

In some embodiments, updating the one or more parameters of the text encoder based on the loss value generated by the contrastive loss function may be configured to train the text encoder to generate latent representations that (i), for training samples that include matched image-text pairs, converge to latent representations generated by the pretrained image encoder and (ii), for training samples that include unmatched image-text pairs, diverge from latent representations generated by the pretrained image encoder.

In some embodiments, a second training sample may be obtained that includes the training image and a second training text string that does not correspond to the training image. A third latent representation of the second training text string may be determined using the text encoder and based on the second training text string. A second loss value may be determined based on the first latent representation and the third latent representation. One or more additional parameters of the text encoder may be updated based on the second loss value while holding fixed the parameters of the pretrained image encoder.

In some embodiments, obtaining the pretrained image encoder may include initializing an image encoder in a second untrained state, and training the image encoder using a training image data set and independently of the text encoder.

In some embodiments, obtaining the training sample may include obtaining a plurality of training samples. Each respective training sample of the plurality of training samples may include a respective training image and a respective training text string corresponding to the respective training image. Determining the first latent representation of the training image may include determining, for each respective training sample, using the pretrained image encoder, and based on the respective training image, a corresponding latent representation of the respective training image prior to initializing the text encoder.

In some embodiments, a text query may be obtained after updating the one or more parameters of the text encoder. A third latent representation of the text query may be generated using the text encoder and based on the text query. One or more images may be retrieved. Each respective image of the one or more images may be associated with a corresponding latent representation that (i) has been generated by the pretrained image encoder and (ii) has at least a threshold extent of similarity to the third latent representation.

In some embodiments, an image query may be obtained. A third latent representation of the image query may be generated using the pretrained image encoder and based on the image query. One or more text strings may be retrieved. Each respective text string of the one or more text strings may be associated with a corresponding latent representation that (i) has been generated by the text encoder after updating the one or more parameters of the text encoder and (ii) has at least a threshold extent of similarity to the third latent representation.

In some embodiments, an image, a first text string, and a second text string may be obtained. A third latent representation of the image may be generated using the pretrained image encoder and based on the image. A fourth latent representation of the first text string may be generated using the text encoder and based on the first text string. A fifth latent representation of the second text string may be generated using the text encoder and based on the second text string. A first similarity may be determined between the third latent representation and the fourth latent representation and a second similarity may be determined between the third latent representation and the fifth latent representation. It may be determined that the first similarity exceeds the second similarity. Based on determining that the first similarity exceeds the second similarity, it may be determined that the image belongs to a class corresponding to the first text string.

In some embodiments, an image, a text string, the pretrained image encoder, and the text encoder may be obtained. A third latent representation of the image may be determined using the pretrained image encoder and based on the image. A fourth latent representation of the text string may be determined using the text encoder and based on the text string. A similarity may be determined between the third latent representation and the fourth latent representation. An output may be generated based on the similarity.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   obtaining (i) a pretrained image encoder and (ii) a training sample comprising a training image and a training text string corresponding to the training image;
   initializing a text encoder in an untrained state;
   determining, by the pretrained image encoder and based on the training image, a first latent representation of the training image;
   determining, by the text encoder and based on the training text string, a second latent representation of the training text string;
   determining a loss value based on the first latent representation as determined by the pretrained image encoder and the second latent representation as determined by the text encoder;
   updating, based on the loss value, one or more parameters of the text encoder while holding fixed all parameters of the pretrained image encoder throughout training of the text encoder; and
   outputting the text encoder in a trained state.

2. The computer-implemented method of claim 1, wherein the pretrained image encoder and the text encoder form a multimodal contrastive learning pair, and wherein updating the one or more parameters of the text encoder is configured to train the text encoder to determine latent representations that, for a given training sample, converge to latent representations determined by the pretrained image encoder.

3. The computer-implemented method of claim 1, wherein initializing the text encoder comprises:

initializing parameters of the text encoder using substantially randomly selected values.

4. The computer-implemented method of claim 1, wherein a size of the first latent representation is equal to a size of the second latent representation.

5. The computer-implemented method of claim 4, wherein an output layer of the pretrained image encoder has a first size, and wherein the text encoder comprises a final projection layer configured to project an output of a penultimate layer of the text encoder to the first size.

6. The computer-implemented method of claim 1, wherein determining the loss value comprises:

determining the loss value using a contrastive loss function configured to determine a similarity between the first latent representation as determined by the pretrained image encoder and the second latent representation as determined by the text encoder.

7. The computer-implemented method of claim 6, wherein updating the one or more parameters of the text encoder based on the loss value determined by the contrastive loss function is configured to train the text encoder to determine latent representations that (i), for training samples comprising matched image-text pairs, converge to latent representations determined by the pretrained image encoder and (ii), for training samples comprising unmatched image-text pairs, diverge from latent representations determined by the pretrained image encoder.

8. The computer-implemented method of claim 1, further comprising:

obtaining a second training sample comprising the training image and a second training text string that does not correspond to the training image;

determining, using the text encoder and based on the second training text string, a third latent representation of the second training text string;

determining a second loss value based on the first latent representation and the third latent representation; and updating, based on the second loss value, one or more additional parameters of the text encoder while holding fixed all the parameters of the pretrained image encoder.

9. The computer-implemented method of claim 1, wherein obtaining the pretrained image encoder comprises:

initializing an image encoder in a second untrained state; and training the image encoder using a training image data set and independently of the text encoder.

10. The computer-implemented method of claim 1, further comprising:

obtaining a text query after updating the one or more parameters of the text encoder;

generating, using the text encoder and based on the text query, a third latent representation of the text query; and retrieving one or more images, wherein each respective image of the one or more images is associated with a corresponding latent representation that (i) has been generated by the pretrained image encoder and (ii) has at least a threshold extent of similarity to the third latent representation.

11. The computer-implemented method of claim 1, further comprising:

obtaining an image query;

generating, using the pretrained image encoder and based on the image query, a third latent representation of the image query; and retrieving one or more text strings, wherein each respective text string of the one or more text strings is associated with a corresponding latent representation that (i) has been generated by the text encoder after updating the one or more parameters of the text encoder and (ii) has at least a threshold extent of similarity to the third latent representation.

12. The computer-implemented method of claim 1, further comprising:

obtaining an image, a first text string, and a second text string;

generating, using the pretrained image encoder and based on the image, a third latent representation of the image;

generating, using the text encoder, (i) a fourth latent representation of the first text string based on the first text string and (ii) a fifth latent representation of the second text string based on the second text string;

determining (i) a first similarity between the third latent representation and the fourth latent representation and (ii) a second similarity between the third latent representation and the fifth latent representation;

determining that the first similarity exceeds the second similarity; and based on determining that the first similarity exceeds the second similarity, determining that the image belongs to a class corresponding to the first text string.

13. The computer-implemented method of claim 1, wherein determining the first latent representation of the training image comprises:

precomputing the first latent representation by the pretrained image encoder prior to training of the text encoder.

14. The computer-implemented method of claim 13, wherein determining the loss value comprises:

reusing, throughout the training of the text encoder, the first latent representation as precomputed by the pretrained image encoder.

15. The computer-implemented method of claim 14, wherein:

obtaining the training sample comprises obtaining a plurality of training samples, wherein each respective training sample of the plurality of training samples comprises a respective training image and a respective training text string corresponding to the respective training image;

determining the first latent representation of the training image comprises precomputing, for each respective training sample, by the pretrained image encoder, and based on the respective training image, a corresponding latent representation of the respective training image prior to training of the text encoder; and determining the loss value comprises reusing, throughout the training of the text encoder, the corresponding latent representation as precomputed by the pretrained image encoder for the respective training sample.

16. A system comprising:

a processor; and a non-transitory computer-readable medium having stored thereon instructions that, when executed by the processor, cause the processor to perform operations comprising:

obtaining (i) a pretrained image encoder and (ii) a training sample comprising a training image and a training text string corresponding to the training image;

initializing a text encoder in an untrained state;

determining, by the pretrained image encoder and based on the training image, a first latent representation of the training image;

determining, by the text encoder and based on the training text string, a second latent representation of the training text string;

determining a loss value based on the first latent representation as determined by the pretrained image encoder and the second latent representation as determined by the text encoder;

updating, based on the loss value, one or more parameters of the text encoder while holding fixed all parameters of the pretrained image encoder throughout training of the text encoder; and outputting the text encoder in a trained state.

17. The system of claim 16, wherein the pretrained image encoder and the text encoder form a multimodal contrastive learning pair, and wherein updating the one or more parameters of the text encoder is configured to train the text encoder to determine latent representations that, for a given training sample, converge to latent representations determined by the pretrained image encoder.

18. The system of claim 16, wherein determining the first latent representation of the training image comprises:

precomputing the first latent representation by the pretrained image encoder prior to training of the text encoder.

19. A computer-implemented method comprising:

obtaining an image, a text string, a pretrained image encoder, and a text encoder, wherein the text encoder has been trained by a training process comprising:

obtaining (i) the pretrained image encoder and (ii) a training sample comprising a training image and a training text string corresponding to the training image;

initializing the text encoder in an untrained state;

determining, by the pretrained image encoder and based on the training image, a first latent representation of the training image;

determining, by the text encoder and based on the training text string, a second latent representation of the training text string;

determining a loss value based on the first latent representation as determined by the pretrained image encoder and the second latent representation as determined by the text encoder; and updating, based on the loss value, one or more parameters of the text encoder while holding fixed all parameters of the pretrained image encoder throughout training of the text encoder;

determining, by the pretrained image encoder and based on the image, a third latent representation of the image;

determining, by the text encoder and based on the text string, a fourth latent representation of the text string;

determining a similarity between the third latent representation and the fourth latent representation; and generating an output based on the similarity.

20. A non-transitory computer-readable medium having stored thereon instructions that, when executed by a processor, cause the processor to perform operations comprising:

obtaining an image, a text string, a pretrained image encoder, and a text encoder, wherein the text encoder has been trained by a training process comprising:

obtaining (i) the pretrained image encoder and (ii) a training sample comprising a training image and a training text string corresponding to the training image;

initializing the text encoder in an untrained state;

determining, by the pretrained image encoder and based on the training image, a first latent representation of the training image;

determining, by the text encoder and based on the training text string, a second latent representation of the training text string;

determining a loss value based on the first latent representation as determined by the pretrained image encoder and the second latent representation as determined by the text encoder; and updating, based on the loss value, one or more parameters of the text encoder while holding fixed all parameters of the pretrained image encoder throughout training of the text encoder;

determining, by the pretrained image encoder and based on the image, a third latent representation of the image;

determining, by the text encoder and based on the text string, a fourth latent representation of the text string;

determining a similarity between the third latent representation and the fourth latent representation; and generating an output based on the similarity.

* * * * *